United States Patent [19]
Lasken

[11] Patent Number: 6,108,796
[45] Date of Patent: *Aug. 22, 2000

[54] FAULT TOLERANT MULTI-DROP COMMUNICATIONS SYSTEM

[75] Inventor: Richard D. Lasken, Naperville, Ill.

[73] Assignee: Goss Graphic Systems, Inc., Westmont, Ill.

[ * ] Notice: Under 35 U.S.C. 154(b), the term of this patent shall be extended for 1382 days.

[21] Appl. No.: 08/521,162

[22] Filed: Aug. 30, 1995

Related U.S. Application Data

[63] Continuation of application No. 08/235,270, Apr. 29, 1994, abandoned, and a continuation of application No. 07/762,832, Sep. 19, 1991, abandoned.

[51] Int. Cl.[7] .......................... H02H 3/05; H03K 19/003; H04B 1/74; H04L 1/22
[52] U.S. Cl. ...................... 714/4; 714/2; 714/10
[58] Field of Search .................... 395/325, 11.2; 714/2–11, 25, 26, 27, 28, 799

[56] References Cited

U.S. PATENT DOCUMENTS

| | | | |
|---|---|---|---|
| 3,162,827 | 12/1964 | Border et al. | 333/2 |
| 4,254,496 | 3/1981 | Munter | 370/16 |
| 4,308,613 | 12/1981 | Chasek | 370/94 |
| 4,575,842 | 3/1986 | Katz et al. | 370/16 |
| 4,623,884 | 11/1986 | Ihara et al. | 340/825.05 |
| 4,704,713 | 11/1987 | Haller et al. | 370/3 |
| 4,933,940 | 6/1990 | Walter et al. | 371/9.1 |
| 4,991,174 | 2/1991 | Mori et al. | 371/15.1 |
| 4,993,015 | 2/1991 | Fite, Jr. | 370/16 |

*Primary Examiner*—Emmanuel L. Moise
*Attorney, Agent, or Firm*—Marshall, O'Toole, Gerstein, Murray & Borun

[57] ABSTRACT

A fault tolerant multi-drop communications system (10) having a plurality of communication nodes (14), and a main control system (12) for the communication nodes (14). The system (10) has a device for disenabling a node (14) having a fault while maintaining communications between the main control system (12) and the remaining nodes (14).

23 Claims, 2 Drawing Sheets

FAULT TOLERANT MULTI-DROP COMMUNICATIONS SYSTEM

This is a continuation of application Ser. No. 08/235,270, filed Apr. 29, 1994, abandoned, a continuation of application Ser. No. 762,832, filed Sep. 19, 1991, abandoned.

BACKGROUND OF THE INVENTION

The present invention relates to a fault tolerant communications system.

In the past, multi-drop communications systems have been known. Such systems may comprise a control system and a plurality of communications nodes communicating with the control system. However, if a failure or fault occurs in such systems, the entire system is rendered inoperable. The fault in the system must be isolated and repaired, thus causing undesirable delays in the system operation. Some attempts have been made to bypass a faulty node under these circumstances, but in these devices it has been necessary to include the bypass circuitry in each of the nodes, thus rendering the system unduly complex and expensive. Typical systems of this sort are disclosed in U.S. Pat. Nos. 3,162,827, 4,254,496, 4,308,613, 4,623,884, 4,575,842, 4,704,713, 4,993,015, 4,991,174, 4,933,940.

SUMMARY OF THE INVENTION

A principal feature of the present invention is the provision of an improved fault tolerant multi-drop communication system.

The communications system of the present invention comprises, a plurality of communication nodes, and a main control system for the communication nodes.

A feature of the present invention is that the system disenables a node having a fault.

Another feature of the present invention is that communications is maintained between the main control system and the remaining nodes irrespective of a node having a fault.

Thus, a feature of the present invention is that the fault may be isolated and placed in a disenabled configuration while maintaining communications with the rest of the system.

Yet another feature of the invention is that the system checks for a failed component of the system.

A further feature of the invention is that the control system may cause opening of a fuse in the failed node in order to remove the failed node from the operational configuration of the system.

Another feature of the invention is that the system detects faults of the type in which a line in the communications system is open.

Yet another feature of the invention is that the control system is connected in the path of a loop to the various communication nodes.

Still another feature of the invention is that the control system may communicate in opposed paths or directions over the loop to the various nodes at a location adjacent the fault.

Thus, a feature of the present invention is that the control system maintains communications in the loop by communicating with the nodes on opposed paths of the fault.

Another feature of the invention is that the communication nodes each check for proper communications over a predetermined period of time.

Yet another feature of the invention is that communication nodes assume an open configuration in a communications line in response to the fault.

Another feature of the invention is that the control system verifies which nodes are in proper operation, and closes the communications line of the nodes in proper operation on opposed paths of the communications loop.

Still another feature of the invention is that the control system may isolate a pair of nodes adjacent to the fault, and maintain their open or inoperable configuration through an open communications line.

Another feature of the invention is that the control system maintains communications with the communication nodes which remain in proper operation after one or more faulty nodes have been isolated and disenabled.

A feature of the present invention is that the communications system is of simplified structure and reduced cost.

Another feature of the invention is that the system comprises a local area network.

A further feature of the invention is that the control system may be utilized in conjunction with control of a printing press with the communication nodes being associated with the press.

Yet another feature of the invention is that the nodes may comprise a plurality of ink keys in the printing press.

Still another feature of the invention is that the system may remain in operation irrespective of the type of fault until it is desirable to repair or replace the node at fault.

Further features will become more fully apparent in the following description of the embodiments of this invention, and from the appended claims.

DESCRIPTION OF THE PREFERRED EMBODIMENTS

Figure 1:
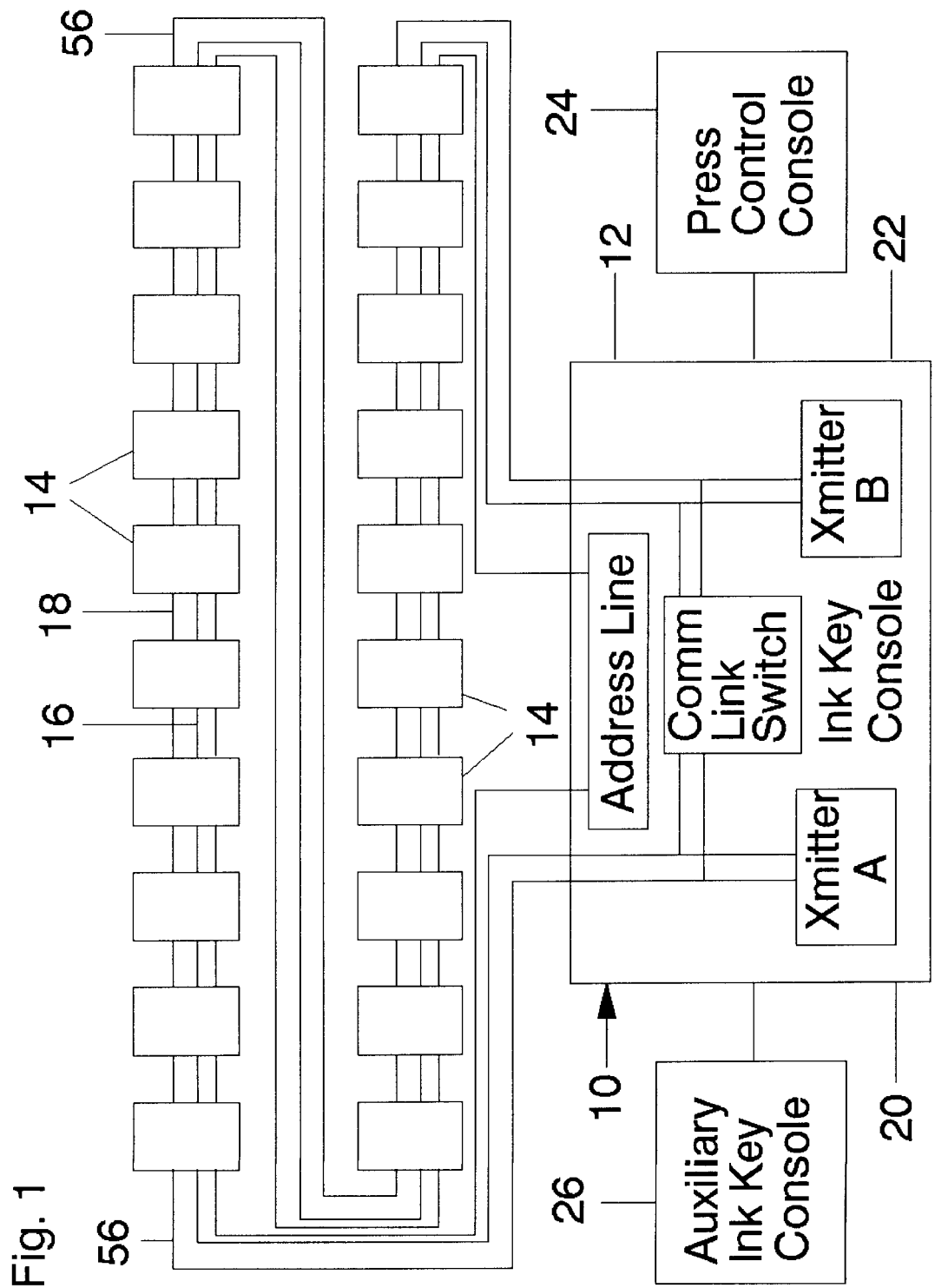
FIG. 1 is a block diagram of a fault tolerant communications system of the present invention.
Figure 2:
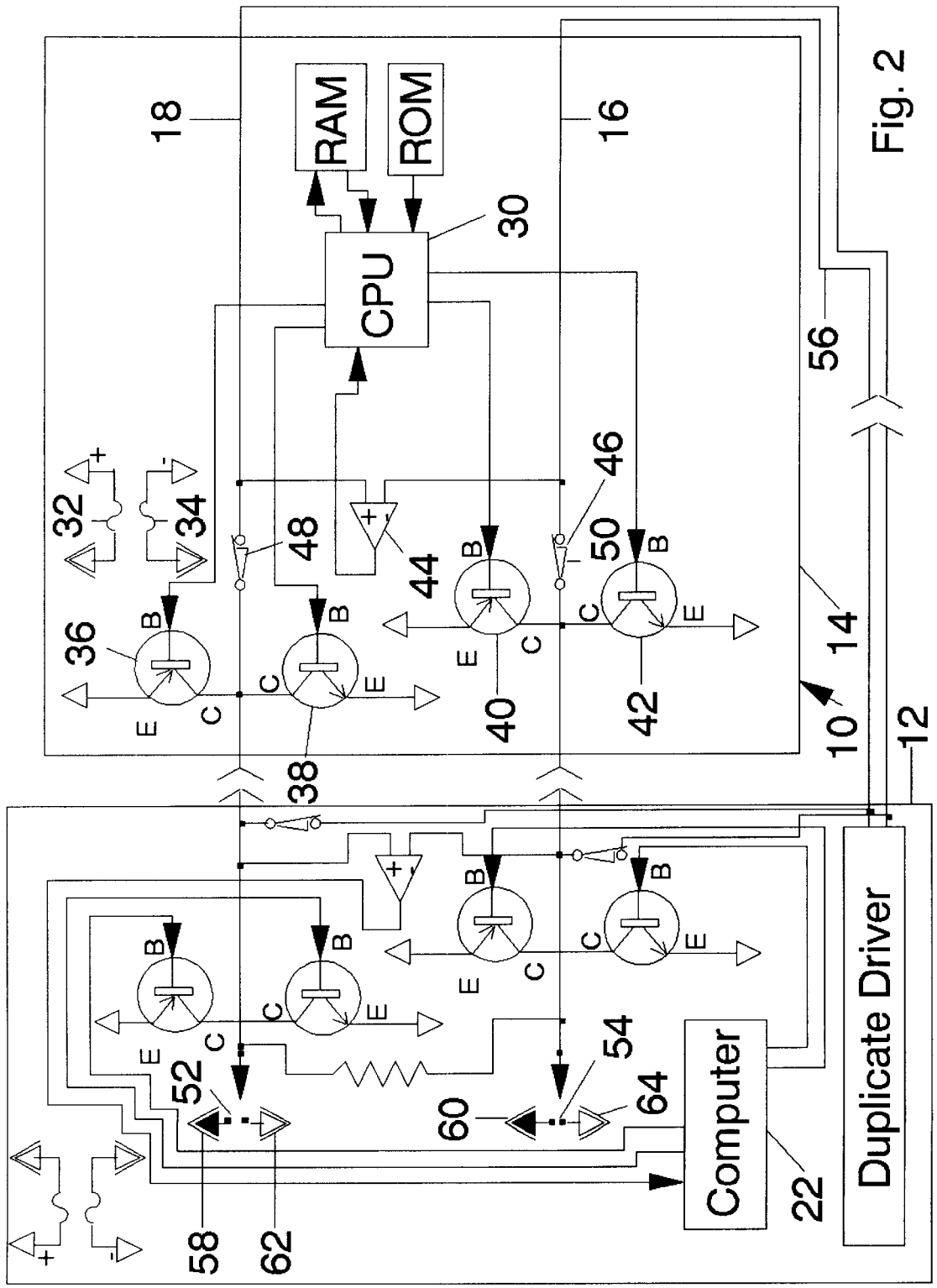
FIG. 2 is a schematic view of a control system and associated communication nodes in the communications systems of FIG. 1.

Referring now to FIG. 1, there is shown a fault tolerant multi-drop communications system generally designated 10 using a differentially operated half-duplex line. As shown, the system 10 has one or more main control systems 12, and a plurality of communication nodes 14 communicating with the control system 12 over a pair of communication lines 16 and 18. In FIG. 2, circuitry for the control system 12 is shown in the upper part of the drawing, and duplicate circuitry for the system 10 connected to the lines 16 and 18 is shown in the lower part of the drawing, termed "Duplicate Driver."

In a preferred form, the control system 12 may comprise a control for desired functions in a printing press. For example, the control system 12 may control the ink keys of a printing press associated with each of the communication nodes 14. Alternatively, the communications system 10 may be utilized to control any suitable device on a printing press, such as the registration, ink and water motors, the press speed, or pneumatic throw offs of the press. In a typical form, 52 keys of the press which control the passage of ink during printing may be associated with each of the nodes 14, with 26 of the nodes being located on one side of the web to be printed, and 26 keys being located on the other side of the web to be printed.

The main control system 12 may have an ink key console 20 which may have a computer 22 or a Central Processing Unit (CPU) having a Randomly Addressable Memory (RAM) and a Read Only Memory (ROM). In this case, the same CPU and communication circuitry of 12 are connected into the communication loop as shown for the ink key console 20. As shown, the control system 12 may also have a press control console 24 and an auxiliary ink key console 26 associated with the ink key console 20. The control system 12 establishes communications with the communication nodes 14 over the lines 16 and 18, with the control system 12 operating in the capacity of a master in a master/slave system, and with the communication nodes 14 operating as the slaves of the system 10. As will be seen below, the units or nodes 14 receive communications from the main control system 12, and may send signals in return to the control system 12 over the communication lines 16 and 18. The communication nodes 14 may each have an associated control system to facilitate communications with the main control system 12. As shown, the main control system 12 is connected to the nodes 14 in opposed paths around a loop 56 on the lines 16 and 18 of the communications system 10. The circuitry associated with one node 14 is shown in FIG. 2, and it will be understood that the system 10 has a plurality of nodes 14 of similar type connected to the lines 16 and 18.

With reference to FIG. 2, each of the communication nodes 14 has a digital computer 30 or a suitable Central Processing Unit (CPU) with Randomly Addressable Memory (RAM) and Read Only Memory (ROM). Each of the nodes 14 has a first fuse 32 connected between power (+V) and the communication circuitry, and a second fuse 34 connected between ground and the communication circuitry, or otherwise connected to circuitry associated with the CPU, such as the I/O of the CPU.

The nodes 14 have a first PNP transistor 36 associated with the line 18, with the emitter E of the transistor 36 being connected to the power supply (+V), the collector C being connected to the communications line 18, and the base B being connected to the CPU or to electrical circuitry associated with the CPU. The nodes 14 also have a second NPN transistor 38 associated with the line 18. The transistor 38 has a collector C connected to the line 18, an emitter E connected to the ground, and a base B connected to the CPU, or to circuitry associated with the CPU. The communication nodes 14 have a third PNP transistor 40 associated with the line 16. The third transistor 40 has an emitter E connected to the power supply (+V), a collector C connected to the line 16, and a base B connected to the CPU, or to circuitry associated with the CPU. The communication nodes 14 also have a fourth NPN transistor 42 associated with the line 16. The transistor 42 has a collector C connected to the line 16, an emitter E connected to ground, and a base B connected to the CPU, or to circuitry associated with the CPU.

The communication nodes 14 also have a differential line comparator 44 having respective inputs from the communication lines 16 and 18, and having its output connected to the CPU, or to circuitry associated with the CPU. In addition, the communication nodes 14 each have a relay 46, with a first contact 48 of the relay 46 being located on the line 18, and a second contact 50 of the relay 46 being located on the line 16.

In the event that the first described procedure of opening the fuses 32 and 34 does not result in proper communications in the system 10, then the control system 12 next assumes that a line may be open in the communication system 10 thus causing the fault. In this condition, the control system 12 attempts to communicate with the nodes 14 over opposed paths or directions of the communications loop 56. In this manner, the control system 12 communicates with successive nodes 14 from opposed paths of the system 10 over the nodes 14 which are operating in a proper manner until the fault in the system 10 is located. In this configuration, the control system 12 communicates with the communication nodes 14 on opposed paths or directions of the loop 56 to the nodes 14 adjacent the fault, and, under these circumstances, the control system 12 continues to operate the communications system 10 over opposed paths of the loop 56 to the communication nodes 14 which are operating in a proper manner while isolating the fault.

In the event of a component failure such that the control system 12 cannot communicate with one or more of the communication nodes 14, the control system 12 attempts to establish communications with the nodes 14 a number of times, such as three times, and only takes remedial action when there is no acknowledgement of the communications between the nodes 14 and the control system 12. In this event, which is assumed to be caused by a short in the system 10, switches 52 and 54 of the control system 12 are first switched to switch contacts 58 and 60 of the power supply (+V) in order to apply full power to the lines 16 and 18 from the master control system 12. Any failed node holding the line to V+ or V− will conduct this current. In this event, the current flows through the transistors 38 and 42 and connect the fuse 34 to ground, thus causing the ground fuse 34 to open. Next, the switches 52 and 54 are switched by the control system 12 to the ground terminals or ground contacts 62 and 64 of the ground, thus causing a short through transistors 36 and 40 from the power supply (+V) in order to open the power fuse 32. Thus, in the case of a fault of this nature, the control system 12 alternately applies power and ground to the communication nodes 14 over the lines 16 and 18 in order to open the fuses 32 and 34 of the node at fault, thus rendering the node 14 at fault inoperable, while maintaining communications with the rest of the communication nodes 14. Thus, in this manner, an initial check is made by the control system 12 for a fault, after which the fuses 32 and 34 of the node 14 at fault are opened in order to disenable the node 14 at fault while maintaining communications between the main control system 12 and the remaining nodes 14 over opposed paths of the loop 56.

In the event that these procedures do not cure the system 10 of the fault, the assumption made by the system 10 at this time is that the system 10 has a short to the power supply (+V), a short to ground, or a short differentially across the lines 16 and 18. Each of the communication nodes 14 has a timer in the CPU of the nodes 14 which is utilized to verify the time elapsed since proper communications in the nodes 14 has been lost for a predetermined period of time, i.e., during the time that communications are not operating in a proper manner. If the predetermined time period in a given communications node 14 has been exceeded while the system 10 is not operating correctly in this node 14, all nodes open their respective contacts 48 and 50 of the relay or relays 46 in order to open the lines 16 and 18 in these nodes 14, as controlled by the CPU. Next, the control system 12 sequentially checks the communication nodes 14 in opposed paths around the loop 56 in order to sequentially determine whether each of the nodes 14 is working in a proper manner. In the event that a given node 14 is working properly, then the control system 12 causes the contacts 48 and 50 of the relay 46 of the next respective node 14 to close, thus establishing communications again by the control system 12 with the properly operating node 14 over the lines 16 and 18. The control system 12 operates in this manner first over a clockwise path of the communications loop 56, and then a counter-clockwise path over either the communications lines 16 and 18, or an address line 33 to enable the correctly operating nodes 14 by closing the contacts 48 and 50 of the relays 46 until the fault is located. When the fault is located adjacent a node 14 by the control system 12, the contacts 48 and 50 of the relays 46 in a pair of nodes on opposed sides of the fault remains in an open configuration, thus rendering the nodes 14 adjacent the fault in a disenabled configuration with the lines 16 and 18 open in these nodes 14. In this manner, the control system 12 may communicate with the remainder of the communication nodes 14 over opposed paths to the nodes 14 which are located between the disenabled nodes 14 and the control system 12. Thus, the control system 12 maintains communications with the properly operating communication nodes 12, while the communication nodes 14 adjacent the fault disenable the faulty node. In this manner, the communications system 10 may continue its operation irrespective of the fault in the system 10 without bypassing a node at fault. This process includes multiple consoles where a fault between CPU's 12 follow the same fault tolerant process.

Thus, in accordance with the present invention, in the event of a fault in the system 10, the control system 12 undertakes a sequence of different operations in order to isolate the fault in the system 10, such that communications may be continued in the system 10 irrespective of the fault or type of fault. In this manner, the communications system 10, which may be a local area network, is not rendered inoperable due to a fault which is isolated by the control system 12 of the present invention. Thus, communications in the system 10 may be continued irrespective of the type of fault isolated by the control system 12 of the present invention. In addition, the control system 12 may display the location of the fault and the type of fault to facilitate repair of the system 10 when desired.

The foregoing detailed description is given for clearness of understanding only, and no unnecessary limitations should be understood therefrom, as modifications will be obvious to those skilled in the art.

What is claimed is:

1. A fault tolerant multi-drop communications system, comprising:
   a plurality of communication nodes;
   a parallel redundant path communicating with the nodes;
   a main control system for the communication nodes;
   means for disenabling, isolating, and sacrificing a node having a short circuit without redundancy or repair while maintaining communications between the main control system and the remaining nodes; and
   means for raising a voltage to the nodes higher than normal such that the raised voltage blows a fuse of a node having a partial short.

2. The system of claim 1 wherein each of the communication nodes has two fuses, and in which the disenabling means comprises means responsive to the main control system for opening said fuse.

3. The system of claim 2 wherein the main CPU or console uses a fuse opening system which switches between power and ground to open the fuses of the communications node having a fault.

4. The system of claim 1 wherein the disenabling means includes means in the main control system for detecting the node having a fault.

5. The system of claim 1 wherein the communication nodes each have an associated control system.

6. The system of claim 1 wherein the communication nodes include means for detecting a fault in the nodes.

7. The system of claim 6 wherein the communication nodes detect a failure of communications over a predetermined period of time.

8. The system of claim 6 including means for disenabling a pair of communication nodes adjacent the fault while maintaining communications between the remaining nodes and the main control system.

9. The system of claim 8 wherein the fault disenabling means comprises means in all of the nodes for opening a communications line, and including means responsive to the main control system for closing the communications line in the communication nodes without a fault.

10. The system of claim 6 including means for disenabling all of the communication nodes and for enabling the nodes without a fault.

11. The system of claim 6 wherein the communications path between the main control system and the communication nodes is in a loop.

12. The system of claim 11 including means for communicating between the main control system and the nodes without a fault from opposed paths of the communications loop.

13. The system of claim 12 including means for using two communication nodes adjacent an intermediate faulted node to isolate the faulted node and permit communications with the rest of the nodes in the path of the communications loop.

14. The system of claim 1 wherein the system is a differentially operated communications line.

15. The system of claim 1 wherein the system is a half-duplex communications line.

16. The system of claim 1 wherein the communication nodes comprise a plurality of ink keys.

17. The system of claim 1 wherein the communication nodes include means for controlling a printing press.

18. The system of claim 1 wherein the system comprises a communications loop between the main control system and the communication nodes, and in which the system communicates on opposed paths to the nodes adjacent the fault.

19. A fault tolerant multi-drop communications system, comprising:
   a plurality of communication nodes having a pair of fuses;
   a parallel redundant path communicating with the nodes;
   a main control system for the communication nodes;
   means for opening a fuse in a communications node having a short circuit to isolate, disenable, and sacrifice said node without redundancy or repair while maintaining communications between the main control system and the remaining nodes; and
   means for raising a voltage to the nodes higher than normal such that the raised voltage blows a fuse of a node having a partial short.

20. The system of claim 19 wherein the opening means is responsive to the condition of a failure of communications between the main control system and at least one of the communication nodes.

21. A fault tolerant multi-drop communications system, comprising:
   a plurality of communication nodes;
   a parallel redundant path communicating with the nodes;
   a main control system connected to the communication nodes in a loop;
   means for establishing communications through opposed paths of the communications loop between the main control system and selected nodes without redundancy or repair adjacent a short circuit to isolate and sacrifice the node at fault and between the nodes intermediate the selected nodes and the main control system; and means for raising a voltage to the nodes higher than normal such that the raised voltage blows a fuse of a node having a partial short.

22. A fault tolerant multi-drop communications system, comprising:

a plurality of communication nodes having means for opening a communications line responsive to failure of communications over a predetermined period of time;

a parallel redundant path communicating with the nodes;

a main control system for the communication nodes;

means for closing the communications line of the nodes operating in a proper manner while maintaining an open configuration of the communication line in a pair of nodes without redundancy or repair adjacent a short circuit to isolate and sacrifice a node at fault; and means for raising a voltage to the nodes higher than normal such that the raised voltage blows a fuse of a node having a partial short.

23. A fault tolerant multi-drop communications system, comprising:

a plurality of communication nodes;

a parallel redundant path communicating with the nodes;

a main control system for the communication nodes;

means responsive to a short circuit in the system for isolating and sacrificing a node at fault without redundancy or repair while maintaining communications in the system; and means for raising a voltage to the nodes higher than normal such that the raised voltage blows a fuse of a node having a partial short.

* * * * *